United States Patent
Moore, III et al.

(10) Patent No.: US 6,725,656 B2
(45) Date of Patent: Apr. 27, 2004

(54) INSULATED EXHAUST MANIFOLD

(75) Inventors: Dan T. Moore, III, Cleveland Heights, OH (US); Ajit Y. Sane, Medina, OH (US)

(73) Assignee: Dan T. Moore Company, Cleveland, OH (US)

( * ) Notice: Subject to any disclaimer, the term of this patent is extended or adjusted under 35 U.S.C. 154(b) by 0 days.

(21) Appl. No.: 10/008,828

(22) Filed: Dec. 7, 2001

(65) Prior Publication Data

US 2003/0106311 A1 Jun. 12, 2003

(51) Int. Cl.$^7$ ................................................. F01N 7/10
(52) U.S. Cl. .............................. 60/323; 60/274; 60/302; 164/98; 428/114
(58) Field of Search .................... 60/302, 322, 323, 60/274, 282; 138/143, 149; 164/98; 428/34.4, 114, 312.4, 312.6, 313.9; 501/104, 102, 134

(56) References Cited

U.S. PATENT DOCUMENTS

| | | |
|---|---|---|
| 3,044,499 A | 7/1962 | Frerich |
| 3,129,727 A | 4/1964 | Tanaka |
| 3,141,479 A | 7/1964 | Mickey |
| 3,488,723 A | 1/1970 | Veazie |
| 3,568,723 A | 3/1971 | Sowards |
| 3,709,772 A | 1/1973 | Rice |
| 3,727,410 A | 4/1973 | Scheitlin et al. |
| 3,750,403 A | 8/1973 | Deutschmann et al. |
| 3,864,908 A | 2/1975 | LaHaye |
| 4,264,660 A | 4/1981 | Siebels |
| 4,276,331 A | 6/1981 | Bothwell |

(List continued on next page.)

FOREIGN PATENT DOCUMENTS

| | | |
|---|---|---|
| DE | 26 30 247 A1 | 1/1978 |
| DE | 39 07 048 A1 | 10/1989 |
| DE | 39 26 429 A1 | 2/1991 |
| DE | 42 16 426 A1 | 11/1992 |
| DE | 199 53 826 A1 | 6/2000 |
| EP | 0 885 650 A2 | 12/1998 |
| EP | 0 928 885 A2 | 7/1999 |
| EP | 0 939 208 A2 | 9/1999 |
| JP | 52047123 A | 4/1977 |
| JP | 58 104318 A | 6/1983 |
| JP | 59 12116 A | 1/1984 |
| JP | 60 81420 A | 5/1985 |
| JP | 60187712 A | 9/1985 |
| JP | 62099612 A | 5/1987 |
| JP | 02 055823 | 2/1990 |
| WO | WO 98 50687 | 1/1998 |

OTHER PUBLICATIONS

English translation of JP 60–187712, reference dated Sep. 1985.

English translation of JP 60–81420, reference dated May 1985.

*Primary Examiner*—Thomas Denion
*Assistant Examiner*—Tu M. Nguyen
(74) *Attorney, Agent, or Firm*—Pearne & Gordon LLP

(57) ABSTRACT

An exhaust manifold is provided having substantially ceramic inner and insulation layers. The manifold preferably has a metal outer structural layer to impart strength to the manifold. The ceramic layers are made of ceramic fibers with the interstitial spaces between the fibers being filled with ceramic filler material. The preferred ceramic fibers are aluminosilicate fibers. The preferred ceramic filler material is alumina, silica, glass-ceramic or other metal oxide. A method of making an exhaust manifold having a substantially ceramic inner and insulation layer is also provided.

38 Claims, 2 Drawing Sheets

U.S. PATENT DOCUMENTS

| | | |
|---|---|---|
| 4,373,331 A | 2/1983 | Santiago et al. |
| 4,526,824 A | 7/1985 | Dworak et al. |
| 4,604,779 A | 8/1986 | Narita et al. |
| 4,849,266 A | 7/1989 | Dwivedi et al. |
| 4,873,952 A | 10/1989 | Narita et al. |
| 4,884,400 A | 12/1989 | Tanaka et al. |
| 4,890,663 A | 1/1990 | Yarahmadi |
| 4,972,674 A | 11/1990 | Yamada et al. |
| 5,018,661 A | 5/1991 | Cyb |
| 5,020,319 A | 6/1991 | Matsuura et al. |
| 5,031,401 A * | 7/1991 | Hinderks .................. 60/302 |
| 5,052,463 A * | 10/1991 | Lechner et al. ............ 164/98 |
| 5,055,435 A | 10/1991 | Hamanaka et al. |
| 5,137,789 A | 8/1992 | Kaushal |
| 5,150,572 A | 9/1992 | Johnson et al. |
| 5,239,956 A | 8/1993 | Keelan et al. |
| 5,404,716 A * | 4/1995 | Wells et al. ................ 60/323 |
| 5,419,127 A | 5/1995 | Moore, III |
| 5,425,236 A | 6/1995 | Haerle |
| 5,525,374 A | 6/1996 | Ritland et al. |
| 5,632,320 A | 5/1997 | Atmur et al. |
| 5,687,787 A * | 11/1997 | Atmur et al. ............... 60/323 |
| 5,816,043 A * | 10/1998 | Wolf et al. ................. 60/323 |
| 5,937,643 A * | 8/1999 | Wang ........................ 60/323 |
| 6,134,881 A * | 10/2000 | Strasser et al. ............. 60/323 |
| 6,161,379 A * | 12/2000 | Haselkorn et al. .......... 60/323 |
| 6,230,490 B1 | 5/2001 | Suzuki et al. |
| 6,348,430 B1 | 2/2002 | Lindner et al. |
| 6,349,542 B1 | 2/2002 | Moore, III |

\* cited by examiner

INSULATED EXHAUST MANIFOLD

BACKGROUND OF THE INVENTION

1. Field of the Invention

The present invention relates to an exhaust manifold, and more particularly to an insulated exhaust manifold for an internal combustion engine in a motor vehicle.

2. Description of Related Art

Catalytic converters in motorized vehicles, particularly passenger automobiles, must reach a certain temperature before they "light off". Light off occurs when the catalytic converter begins to convert harmful pollutants by oxidizing carbon monoxide and hydrocarbons to $CO_2$, and reducing $NO_x$ to $N_2$ and $O_2$. It is important to minimize the time to light off once a car is started to minimize the amount of harmful pollutants emitted to the atmosphere.

Catalytic converters are typically heated to light off by the high temperature engine exhaust gas itself. Unfortunately, the catalytic converter is normally mounted downstream of the exhaust manifold which conducts the heated exhaust gas from the engine. A typical exhaust manifold is made of metal, or substantially made of metal. Metal exhaust manifolds conduct and disperse thermal energy away from exhaust gas to the outside atmosphere. This loss in thermal energy reduces the exhaust gas temperature before it reaches the catalytic converter and delays light off.

Various techniques for insulating exhaust manifolds and/or for providing other means to speed up light off have been suggested and attempted. Cast iron exhaust manifolds are useful but heavy. Also, the mass (large thermal mass) of iron drains heat from the exhaust gas. Welded tubing exhaust manifolds have less mass, but are complicated and expensive. Double-walled welded tubing exhaust manifolds have been suggested, with an air gap between the walls, but the two walls have the same thickness and are both structural and such an exhaust manifold would be unreasonably complex to manufacture.

U.S. Pat. No. 5,419,127 teaches an exhaust manifold having inner and outer metal walls enclosing a layer of insulating material. Because the inner layer is metal, and has finite thermal mass, it conducts heat from the traveling exhaust gas thus delaying light off. In addition, the metal inner layer is subject to erosion or loss of integrity over time from thermal cycling.

There is a need in the art for an exhaust manifold that substantially reduces the amount of heat conducted or convected away from the exhaust gas. Such an improved manifold will provide higher temperature exhaust gas to the catalytic converter, thus minimizing the time from engine start-up to light off.

SUMMARY OF THE INVENTION

An exhaust manifold is provided having a ceramic inner layer which defines an exhaust gas passageway of the manifold, a ceramic insulation layer disposed exterior to and adjacent the inner layer, and an outer structural layer disposed exterior to and adjacent the insulation layer. Each of the inner and insulation layers of the manifold comprises ceramic fibers and ceramic filler material.

A method of making an exhaust manifold is also provided having the steps of: a) providing a first aqueous slurry having 1–2 wt. % solids, wherein the solids comprise a mixture of ceramic filler material and ceramic fibers; b) vacuum forming an insulation layer from the first aqueous slurry; c) providing a second aqueous slurry having 1–2 wt. % solids, wherein the solids comprise a mixture of ceramic filler material and ceramic fibers; d) vacuum forming an inner layer on an interior wall surface of the insulation layer; e) firing the formed insulation and inner layers to provide finished insulation and inner layers respectively; and f) casting a metal outer layer over the insulation layer to form the exhaust manifold.

An exhaust manifold is also provided having a substantially ceramic integrated layer defining an exhaust gas passageway of the manifold, and an outer structural layer disposed exterior to and adjacent the integrated layer. The integrated layer comprises ceramic fibers and ceramic filler material, and has a radial porosity gradient such that localized porosity increases in an outward radial direction in the integrated layer.

A method of making an integrated layer having a radial porosity gradient for an exhaust manifold is also provided. The method has the steps of: a) providing a plurality of aqueous slurries, the slurries comprising a solids mixture of ceramic fibers and ceramic filler material and having incrementally increasing filler:fiber ratios; b) vacuum forming the integrated layer by successively introducing the slurries into a vacuum formation process to provide an integrated layer having a radial porosity gradient.

A method of making an exhaust manifold using a moldable dough is also provided. The method has the following steps: a) combining ceramic fibers, ceramic filler material, a binder, and water in the following proportions to form a dough paste:

| | |
|---|---|
| Ceramic fibers: | 10–30 wt. % |
| Ceramic filler material: | 5–15 wt. % |
| Binder: | 3–10 wt. % |
| Water: | BALANCE; | b) mixing the dough paste to form a moldable dough; c) pressing the moldable dough into a mold to form a shaped part; d) curing or gelling the shaped part so that said shaped part can be handled without causing distortions; e) heating to burn off or remove residual organics and water, thereby forming a finished insulation layer; f) providing an aqueous slurry having 1–2 wt. % solids, said solids comprising a mixture of ceramic filler material and ceramic fibers; g) vacuum forming or spray-forming from the aqueous slurry an inner layer on an interior wall surface of the insulation layer; h) firing the formed insulation and inner layers to provide finished insulation and inner layers respectively; and i) casting a metal outer layer over the insulation layer to the exhaust manifold.

DETAILED DESCRIPTION OF THE PREFERRED EMBODIMENTS OF THE INVENTION

In the description that follows, when a range such as 5 to 25 (or 5–25) is given, this means preferably at least 5 and, separately and independently, preferably not more than 25. As used herein, the porosity of a layer or material is the ratio of void volume to total volume of that layer or material. For example, a layer having a porosity of 30% has a void volume equal to 30% of the layer's total volume. Localized porosity refers to the local porosity of a layer at a given radial distance from that layer's inner surface. Unless otherwise explicitly stated, localized porosities are uniform for a given radial distance from the inner surface of a particular layer. The notation "wt. %" means percent by weight.

The term ceramic includes any inorganic compound, typically (though not necessary) crystalline, formed between a metallic (or semimetallic) and a nonmetallic element, and mixtures thereof; for example, alumina ($Al_2O_3$), titania ($TiO_2$), and boron nitride (BN), where Al and Ti are metallic elements, B is semimetallic, and O and N are both nonmetallic. Ceramics also include mixtures of ceramic compounds; i.e. soda-lime-silica glass is a ceramic composed of sodium oxide, calcium oxide and silicon oxide. As used herein, a ceramic (such as a ceramic layer, ceramic fibers, ceramic filler material, or any other ceramic component or material) can be and is preferably substantially ceramic; i.e. preferably comprises at least 80, preferably at least 85, preferably at least 90, preferably at least 92, preferably at least 94, preferably at least 96, preferably at least 98, wt. % ceramics as described in the previous sentence, with the balance being additives and/or contaminants. Ceramics or ceramic materials include glasses, such as borosilicate glass, aluminosilicate glass, calcium aluminoborate glass, calcium aluminoborosilicate, and other known or conventional glass materials. Glasses are a special subclass of ceramic materials which have an amorphous structure.

Figure 1:
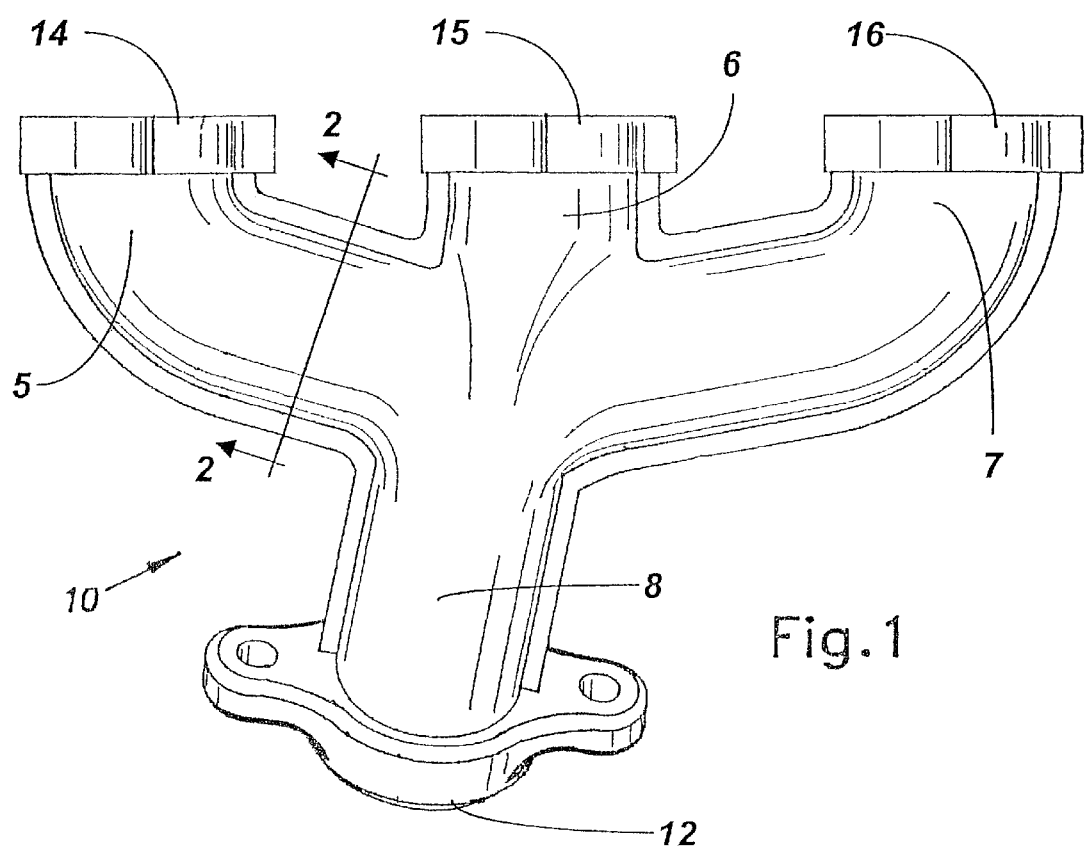
FIG. 1 is a top view of an exhaust manifold of the present invention for conducting exhaust gas away from one side of a typical V-6 engine.

An exhaust manifold according to the invention has at least one inlet and at least one outlet. With reference to FIG. 1, an exhaust manifold 10 is shown having three inlets or runners 5, 6 and 7 and one collector or outlet tube 8. Preferably, runners 5, 6, and 7 have inlet flanges 14, 15 and 16 respectively for mounting to exhaust ports in the engine block, and outlet tube 8 preferably has an outlet flange 12 for mounting to the exhaust pipe of an exhaust system. The manifold pictured in FIG. 1 is configured to conduct exhaust gas away from one side of a typical V-6 internal combustion engine. Exhaust gas from each of three cylinders on one side of the engine (not shown) enters that cylinder's corresponding runner 5, 6 or 7 in the exhaust manifold and exits the manifold through outlet tube 8. The outer surfaces of the inlet flanges preferably define a plane of assembly for mounting the exhaust manifold 10 to the head of the internal combustion engine. The inlet flanges 14, 15, and 16, and outlet flange 12 are all preferably made from cast iron or steel.

It will be understood that an invented manifold can be configured having, for example, 2, 4, 6, or any number of runners to accommodate engines having different numbers of cylinders (e.g. 4, 8, 12, etc.) and different configurations (e.g. in-line instead of V-oriented cylinders).

Figure 2:
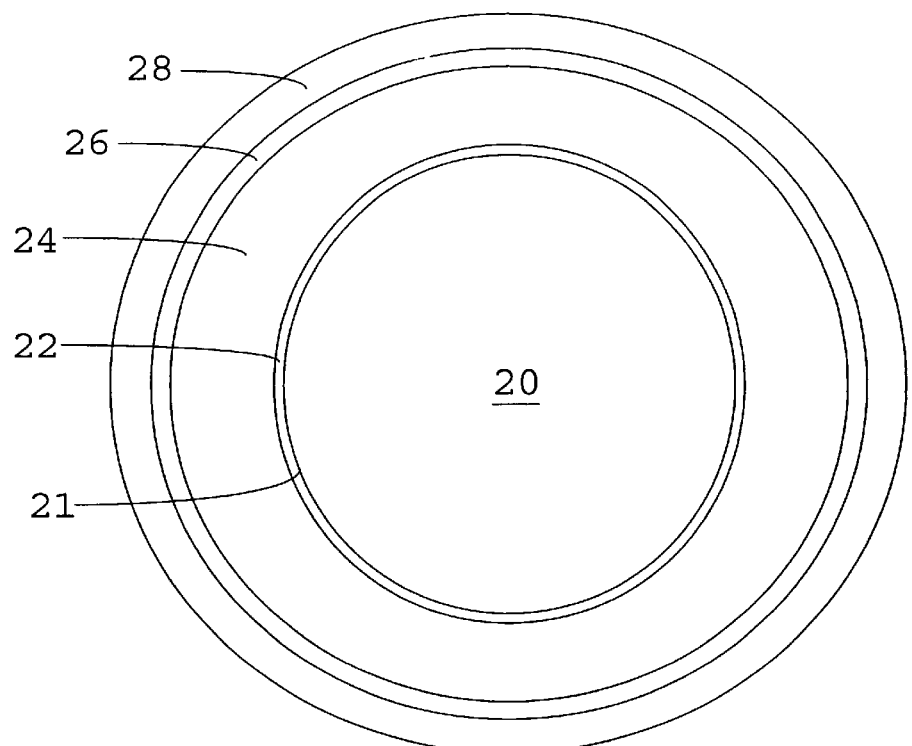
FIG. 2 is a cross-sectional view taken along line 2—2 in FIG. 1 showing an inner layer, insulation layer, strain isolation layer, and an outer structural layer according to a first preferred embodiment of the invention.

Referring to FIG. 2, manifold 10 is composed of multiple layers. Preferably, all the runners and the outlet tube have the same multiple layer construction. The manifold 10 has at least the following layers: inner layer 22, insulation layer 24, and outer structural layer (or outer layer) 28. Optionally and preferably, manifold 10 also has a strain isolation layer 26 disposed between outer layer 28 and insulation layer 24. The compositions and physical characteristics of each of the above layers will now be described.

Inner layer 22 defines an exhaust gas passageway 20 preferably having a diameter of 1–2 inches. Inner layer 22 is a dense ceramic layer or glaze that provides a smooth, nonporous or substantially nonporous, thermally resistant inner surface 21 for contacting hot exhaust gas as it passes through the manifold 10. The inner layer 22 is composed of ceramic fibers and a non-fibrous ceramic filler material. The ceramic filler material preferably fills the void or interstitial space between the fibers, and preferably coats the fibers. The ceramic fibers are preferably aluminosilicate fibers, less preferably silica fibers, less preferably alumina (such as Saffil from DuPont) or zirconia fibers, less preferably alumina-borosilicate fibers (such as Nextel from 3M), less preferably a mixture thereof. The above ranking of ceramic fibers is largely based on material cost and/or shrinkage under operating and processing conditions. (Aluminosilicate fibers are presently the most widely available ceramic fibers (and are less expensive than alumina or zirconia) that are suitable to withstand the temperature ranges for many exhaust manifolds, typically 1600–1800° F.). Any of the above fibers will perform adequately for most exhausts having a temperature of about 1600–1800° F. (i.e. automobile exhausts). Silica can withstand exhaust temperatures up to about 2100° F., while the more expensive alumina and zirconia fibers can withstand exhaust temperatures up to 2300° F. and beyond. These more expensive fibers should only be used when required to withstand such high-temperature exhausts over a sustained time interval.

The ceramic filler material in inner layer 22 is selected to be stable or substantially stable against oxidation in strong oxidizing environments up to 1600, 1800, 2000, 2100, or 2300, ° F., or greater, as the application requires. Material preference can be based on factors other than but not excluding performance. Such additional factors may include cost, ease of fabrication or incorporation into a particular manufacturing scheme, and thermo-mechanical compatibility with other constituents. Preferred ceramic filler materials suitable to withstand oxidation up to 2100° F. are alumina, mullite (aluminosilicate), silica, other metal oxides (e.g. titania, magnesia, or ceria), partially stabilized zirconia (PSZ), silicon carbide, silicon nitride, aluminum nitride, silicon boride, molybdenum disilicide, as well as borides, carbides, nitrides and oxides of refractory metals, and mixtures thereof. Included in these materials is a glass or glass-ceramic frit constituting some of these components: alumina, silica, $B_2O_3$, $P_2O_5$, $TiO_2$ and an alkaline earth oxide such as MgO, CaO or a mixture thereof. Less preferably, the ceramic filler material can be an alkaline oxide or transition metal oxide. Alkaline oxides and transition metal oxides may provide similar performance to alumina or silica filler materials in inner layer 22. Less preferably, the ceramic filler material in inner layer 22 is SiC, $SiB_4$, $Si_3N_4$, or a mixture thereof. Such materials are even less preferred when the ceramic filler material in inner layer 22, particularly non-fibrous and crystalline ceramic, is in the sintered form. Less preferably, the ceramic filler material can be those glasses that may cause unacceptable dimensional changes in ceramic fibers, for example, when used in conjunction with silica or high silica fibers: glasses such as alkali containing calcium borosilicate glass, aluminosilicate glass, calcium aluminoborate glass, less preferably any other glass material capable of withstanding exhaust temperatures of 1200, preferably 1400, preferably 1600, preferably 1800, preferably 2100, ° F. Less preferably, ceramic filler material in inner layer 22 can be any other highly refractive ceramic material known in the art. The ceramic filler material is preferably provided as a ceramic powder (preferably colloidal when used as an inorganic binder) which, once it is fired, preferably forms into and fills the spaces between, preferably coating, the ceramic fibers. The ceramic fibers can be short fibers, long fibers, or a mixture thereof. Preferably, short fibers have a length of about 10–1000, preferably 20–100, μm, and long fibers have a length greater than 10,000 μm (10 mm). Both long and short fibers preferably have a diameter of 0.1–20, preferably 0.15–10, preferably 0.2–5, μm. Inner layer 22 is preferably 40–98, preferably 50–96, preferably 60–94, preferably 70–92, preferably 75–90, wt. % ceramic filler material, balance ceramic fibers. Inner layer 22 preferably has a porosity less than 20%, preferably less than 15%, preferably less than about 10%, with the localized porosity at the inner surface 21 of inner layer 22 being near zero or substantially zero, preferably less than 5, preferably less than 3, preferably less than 1, percent. It is important to have a very low (near zero) localized porosity at the inner surface 21 in order to provide a gas-tight or substantially gas-tight exhaust passageway 20, and further to provide a highly smooth surface to minimize frictional losses and pressure drop across the manifold 10. Preferably, inner layer 22 has a thickness of 0.05–5, preferably 0.08–3, preferably 0.1–2, mm.

Figure 3:
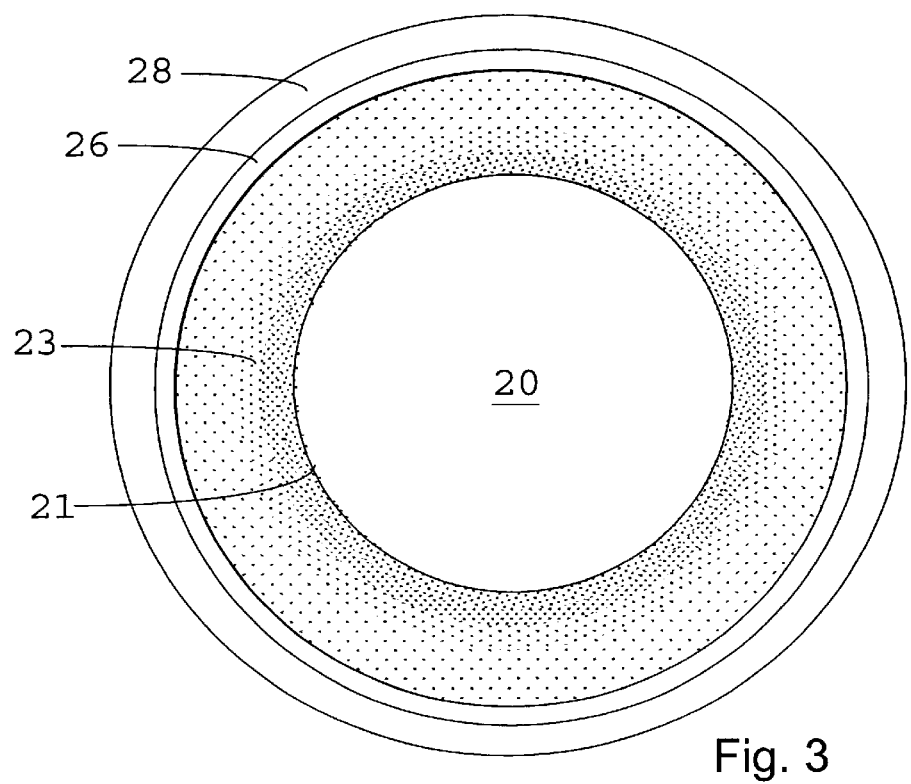
FIG. 3 is a cross-sectional view similar to FIG. 2 but showing an integrated insulation layer, strain isolation layer and outer structural layer according to a second preferred embodiment of the invention.

The invented inner layer has low thermal conductivity and thermal diffusivity compared to metal. In addition, it is backed up by a similar highly insulating layer 24 as shown in FIG. 2, or integrated layer 23 as shown in FIG. 3 and described below. Consequently, the passing exhaust gas in passageway 20 will retain a greater proportion of its thermal energy rather than conducting/convecting it to the outer layers as heat.

Insulation layer 24 is also a ceramic layer, and is composed of ceramic fibers and a non-fibrous (preferably colloidal) ceramic filler material similarly to inner layer 22. The ceramic fibers and filler material in insulation layer 24 can be the same materials as inner layer 22, except they are combined in different ratios. As can be seen in FIG. 2, insulation layer 24 is preferably disposed exterior to and adjacent, preferably in direct contact with, the inner layer 22. Preferably, the ceramic fibers in layer 24 are alumina fibers, or aluminosilicate (or boroaluminosilicate) fibers of sufficiently high alumina content, preferably 40–99, more preferably 50–90, more preferably 55–80, most preferably 60–75, wt. % alumina. High alumina content enables the insulation layer 24 to resist shrinkage at high temperature. Alternatively, high purity silica fibers may be used if the manifold 10 is to be used with lower temperature exhaust such that the resulting shrinkage of insulation layer 24 is not greater than 0.5%. Insulation layer 24 has a porosity of 20–95, preferably 40–90, preferably 60–90, preferably 70–90, preferably about 75–85, percent. This high porosity is achieved by decreasing the ratio of ceramic filler material to fibers compared to inner layer 22.

It is possible to use ceramic filler material having a high level of microporosity, thereby increasing the thermal resistance. For example, silica in the form of silica aerogel particles, can be used to fill interfiber spaces to improve insulating characteristics of the layer. The insulation layer is preferably 1–35, preferably 4–30, preferably 6–25, preferably 8–20, preferably about 10–15, wt. % ceramic filler material, balance ceramic fibers. Less preferably, insulation layer 24 could be substantially 100 wt. % ceramic fibers with no filler material. Insulation layer 24 preferably has a thickness of 1–40, preferably 2–30, preferably 2–20, mm.

Insulation layer 24 is preferably rigidized to promote dimensional stability and erosion resistance. Rigidization is preferably achieved with one of the following rigidizers: colloidal silica or silica precursor, colloidal alumina or alumina precursor, finely divided glass frit, or a mixture thereof. Where one of the above (or another) rigidizer is used as the ceramic filler material in layer 24, no additional rigidizer is required. Where a non-rigidizer is used as the ceramic filler material, layer 24 preferably also contains 1–15, preferably 3–12, preferably 4–10, preferably 5–8, preferably about 6, wt. % rigidizer.

The invented, highly porous insulation layer 24 is effective to insulate the exhaust gas traveling through passageway 20 adjacent inner layer 22 such that it retains at least 75, preferably 80, preferably 90, percent of its initial thermal energy (or temperature) upon exiting the manifold 10.

The strain isolation layer 26 is an optional layer, and is preferably disposed exterior to and adjacent, preferably coated on or in direct contact with, the outer wall surface of insulation layer 24. Strain isolation layer 26 is disposed between the insulation layer 24 and the outer layer 28. Strain isolation layer 26 is a very thin layer, preferably 0.05–2, more preferably 0.1–0.5, mm thick, and is preferably made of ceramic fibers and/or ceramic filler material. Preferably, strain isolation layer 26 is composed of the same or similar ceramic fibers as inner and insulation layers 22 and 24. However, the ceramic filler material in isolation layer 26 is chosen to be metal resistant; i.e. to resist seepage of molten metal during application or casting of outer structural layer 28 which is preferably a metal layer as will be described. The preferred metal resistant ceramic filler material in strain isolation layer 26 depends on the metal used for outer layer 28. If outer layer 28 is a ferrous metal layer (i.e. steel), then zirconia, alumina, boron nitride, zircon (zirconium silicate $ZrSiO_4$), or a mixture thereof is the preferred ceramic filler material for layer 26. If aluminum or an aluminum alloy is used for outer layer 28, then the preferred ceramic filler material for isolation layer 26 is alumina, boron nitride, calcium aluminoborate glass, calcium aluminoborosilicate, calcium aluminate cement or a mixture thereof. When boron nitride is used (preferably with a ferrous metal outer layer 28), the boron nitride is preferably applied via spray coating, dipping, or other similar means. Boron nitride is preferably applied as a slurry of boron nitride and a liquid such as water, preferably having ceramic fibers as described above dispersed therein. Strain isolation layer 26 preferably has 70–99, preferably 80–90, wt. % ceramic fibers, balance filler material. When boron nitride, zircon, alumina and mixtures containing them are used for the isolation layer, ceramic fibers may not be required but are preferred. Layer 26 is a compliant layer and is not rigidized.

Layer 26 absorbs vibration from the engine as well as road harshness. Layer 26 also accommodates or dampens the unmatched thermal expansion characteristics of outer layer 28 and insulation layer 24. Because layer 28 is preferably made of metal, and layer 24 is substantially ceramic, outer layer 28 has a much higher coefficient of thermal expansion than insulation layer 24 (typically about or at least twice as high). Consequently, the expansion and contraction of outer layer 28 (due to thermal cycling) would likely cause the ceramic insulation layer 24 to fracture in the absence of a compliant strain isolation layer 26.

As indicated above, outer layer 28 is a structural layer and is preferably made from metal. Preferably, layer 28 is a metal-containing layer or a metal composite layer. Metal-containing materials and metal composites are generally known in the art. Preferably, a metal composite layer contains ceramic filler material such as SiC, alumina, or a mixture thereof. Outer layer 28 is preferably disposed exterior to and adjacent the strain isolation layer 26 if present. Less preferably, in the absence of a strain isolation layer, outer layer 28 is disposed exterior to and adjacent the insulation layer 24. An outer metal layer provides mechanical and impact strength, and ensures gas-tightness of the invented exhaust manifold. Preferably, outer layer 28 is made of a ferrous metal, preferably cast ferrous metal or metal alloy such as steel. Less preferably, outer layer 28 is made from aluminum, less preferably any other suitable metal or metal alloy known in the art. Aluminum conserves weight, but is subject to creeping under stress from an applied load. This is why a ferrous metal (such as steel) outer layer 28 is preferred. However, aluminum can still be used if steps are taken to avoid excess loading of the manifold to maintain stresses below the creep threshold, i.e. with brackets to support the manifold. Preferably, outer layer 28 is 1–25, preferably 2–20, preferably 5–15, mm thick.

An invented exhaust manifold having ceramic inner, insulation and strain isolation layers (22, 24 and 26 respectively) and a metal outer layer 28 is preferably made as follows. Insulation layer 24 is preferably made first via conventional vacuum forming techniques from a premixed slurry. The slurry contains ceramic fibers and ceramic filler material as above described in the proper weight percent proportions for the desired insulation layer, and is preferably an aqueous slurry having about 1–2 wt. % total solids. The layer materials are combined on a dry solids basis according to the proportions and weight percents as described above for the insulation layer. These components together make up the total solids in the slurry. Preferably, the ceramic fibers are provided as clumps of material and not in mats or sheets. Once formed, the insulation layer 24 is fired as conventionally known in the art to form a finished insulation layer. During firing, the ceramic filler material softens or melts and preferably substantially uniformly fills the void space between the ceramic fibers, preferably coating the ceramic fibers or partially sintering and bonding the fibers together. It may be necessary to subject the formed layers to uniform compaction prior to firing to ensure the desired layer density and surface smoothness. This can be achieved via compression molding or a dry bag isostatic pressing technique known in the art.

Inner layer 22 and strain isolation layer 26 can be subsequently deposited (or coated) onto the finished insulation layer 24 via spray coating, pyrolysis, dipping, or other known technique using a slurry specially prepared for each respective layer. A complex manifold may require fabricating two halves (e.g. via a split-mold technique known or conventional in the art) that are joined together by a suitable ceramic cement to form a complete manifold. Suitable cements are conventional in the art and may be obtained from the manufacturers of ceramic fiber or other suppliers of ceramic adhesives. It is also possible to use one of the ceramic frit, described earlier, as a cement. The entire assembly is once again fired to form finished inner and strain 42 isolation layers 22 and 26 respectively. The slurries for the inner and strain isolation layers 22 and 26 are also preferably aqueous slurries having 1–2 wt. % solids.

Preferably, inner layer 22 and insulation layer 24 are formed via a conventional vacuum forming technique with the inner layer 22 being deposited onto the inner surface of insulation layer 24. The combined inner and insulation layer structure is then fired to form finished inner and insulation layers 22 and 24. During firing, the ceramic filler material present in the inner and insulation layers (22 and 24 respectively) preferably coats or binds the ceramic fibers present in that layer. This method is preferred to minimize the number of firings required to form the finished manifold. Preferably, strain isolation layer 26 is then applied to the outer surface of insulation layer 24 via a known technique and fired if necessary. If a boron nitride strain isolation layer is used, then no firing step is necessary and the layer is finished by simply allowing it to dry. Outer layer 28 is then formed or cast onto the outer surface of strain isolation layer 26 to form a finished manifold 10. A metal outer layer 28 is cast via a conventional technique. Less preferably, outer layer 28 can be a nonmetallic structural layer capable of withstanding shock and vibration due to road harshness and engine vibration.

A preferred inner layer is formed on the inner surface of a formed insulation layer 24 as follows. Colloidal or finely divided ceramic filler material such as $SiB_4$, alumina, silicon carbide and/or glass-ceramic frit is combined with high purity aluminosilicate fibers (such as Fiberfrax HSA, or shorter shot-free fibers, from Unifrax, Inc.) in a 5:1 ratio by weight (i.e. for $SiB_4$ filler material: 83.3 wt. % $SiB_4$ and 16.7 wt. % fibers) in water to make an aqueous slurry having 1–2 wt. % total solids. Silica sol (a conventional aqueous suspension of colloidal silica particles) is added slowly in a low intensity mixer to form a slurry having a viscosity of 1,000–100,000 cP. This slurry is then poured into the cavity inside the finished insulation layer 24 which is rotated or swirled until the slurry evenly or substantially uniformly coats the interior wall surface of layer 24. Excess slurry is then drained, and the resulting part is then fired or heated to about 1000–1200° C. at a ramp of 5–10° C./min in air, and held at that temperature for 0.5–1 hour. Once cooled, the part will have an insulation layer 24 with a preferred inner layer 22. If layer 24 is formed via a split mold technique, the two halves of layer 24 are preferably joined and set prior to applying the inner layer 22 as described above.

Optionally, inner layer 22 and strain isolation layer 26 can be similarly comprised and may be applied simultaneously via spray coating, dipping, or other known techniques to the two halves of layer 24, joined by a suitable ceramic cement and assembled to complete the ceramic portion of the manifold. The resulting part is then fired as before to provide an exhaust manifold having inner, insulation and strain isolation layers 22, 24 and 26. This fired ceramic manifold has sufficient rigidity to be used as a ceramic core for metal casting. Outer metal layer 28 is thus provided to the ceramic core via conventional casting techniques to provide the finished invented exhaust manifold.

In another embodiment, an invented manifold can be made from an insulation layer 24 which is formed using a moldable dough technique. First, ceramic fibers, ceramic filler material and a binder are combined with water in the following proportions to form a dough paste:

| | |
|---|---|
| Ceramic fibers: | 10–30 wt. % |
| Ceramic filler material: | 5–15 wt. % |
| Binder: | 3–10 wt. % |
| Water: | BALANCE |

The binder is preferably an organic binder, such as methyl cellulose ether, less preferably starch, less preferably polyvinyl acetate or polyvinyl butyrol, less preferably another known organic binder, less preferably a mixture thereof. Less preferably the binder can be a mixture of organic and inorganic binders. The ceramic fibers and ceramic filler material can be the same as described above for the vacuum formed insulation layer 24.

Once mixed, the dough paste is mixed in a conventional mixer, for example a Hobart mixer, to form a moldable dough. This moldable dough is then pressed into an appropriate mold to form a shaped part, e.g. that of a desired exhaust manifold insulation layer. During this step, some of the water may be squeezed out. Preferably, heat is applied during this step (preferably to 40–100° C. for several minutes, preferably less than 15 minutes) to cause the organic binder to gel, and to drive off excess water. Next, the shaped part is allowed to cool in air, and is once again heated, first preferably to 100–200° C. for about 0.5–1 hour to remove water. It will be understood that the heating time and temperature during this step will depend upon the mass and thickness of the shaped part. Further heating of the shaped part is conducted to burn off residual organics and water, allowing inorganic binders to bond fibers and to form the finished insulation layer 24. The part is heated in the temperature range of 200–1200° C. at about 2–10° C./min. and held at temperature for about ½ hour to 1 hour again depending on the mass and thickness of the shaped part. After heating, the part is allowed to cool. Once the insulation layer 24 is formed, inner, strain isolation and outer layers 22, 26 and 28 can be applied thereto similarly as described above for a vacuum formed insulation layer 24 to produce the exhaust manifold 10.

Optionally, inner layer 22 and insulation layer 24 can be formed together as a single integrated layer 23 as shown in FIG. 3. Integrated layer 23 is composed of ceramic fibers and ceramic filler material as already described. In this embodiment, however, layer 23 has a radial porosity gradient such that the localized porosity increases in an outward radial direction from near zero (preferably less than 5, preferably less than 3, preferably less than 1, percent) at inner wall 21, to 20–95, preferably 60–90, preferably 80–85, percent at the outer surface of layer 23. Such an integrated layer 23 can be prepared by a vacuum formation technique whereby multiple slurries with incrementally increasing filler:fiber ratios are successively introduced to provide a layer 23 with a porosity gradient. Alternatively, a single slurry may be prepared using a filler material having a broad particle size distribution (i.e. 50–400 mesh, preferably 100–400 mesh). Without wishing to be bound by any particular theory, it is believed that during the evacuation step (vacuum being drawn from the inner surface), smaller diameter particles will be sucked a greater distance through the fiber matrix to form a tightly packed inner portion of layer 23 having a high or higher density and low or lower porosity. The larger diameter filler particles will not travel as far through the fiber matrix, and will result in a low or lower density, high or higher porosity region of layer 23 as you get closer to its outer surface.

In a further embodiment, a catalyst belonging to a family of inorganic compounds, $ABO_x$ with O being oxygen, is added to the inner surface 21. Preferably the catalyst has either a perovskite structure (with A being a rare earth element and an alkaline earth element, and B being a transition metal element), or a fluorite structure (with A being a rare earth element and B being Ce or Zr). For a perovskite catalyst, A is preferably La and Sr, and B is preferably Fe, Co or Mn, less preferably Ti, Ga, Cr, or Ni. For a fluorite catalyst, A is preferably a rare earth metal such as Gd or Y and less preferably alkaline earth metal such as Ca or Mg. In addition, other known catalysts, such as partially substituted $BiMoO_3$ and Gd-doped $CeO_2$ can be used. Such a catalyst is preferably activated at a lower temperature than the platinum and palladium catalysts typical of most catalytic converters, and can begin to convert CO and $NO_x$ to $CO_2$ and $N_2$ and $O_2$ during the period prior to light off after a vehicle is started. The catalyst is preferably provided as finely divided (preferably colloidal) particles, and can be added to the inner layer slurry prior to coating the interior wall surface of insulation layer 24. Preferably, the catalyst particles are 0.1–5, preferably 0.5–4, preferably 1–3, wt. % of the total solids in the inner layer slurry.

An invented exhaust manifold has at least the following advantages. Faster light off of the catalytic converter will occur because the exhaust gas retains a greater proportion of its initial thermal energy upon entry into the catalytic converter. Also, because heat loss to the exhaust manifold is significantly reduced, lighter metal such as aluminum can be used in the manifold provided operational stresses to the manifold are minimized as described above. The need for heat shields may also be reduced or eliminated. Further, an invented manifold resists erosion and corrosion because the ceramic inner layer 22 (or integrated layer 23) effectively resists these effects.

In all of the embodiments described above, it will be understood that all of the ceramic layers of a finished exhaust manifold can be made separately, as separate parts or layers. In that event, the separate ceramic parts or layers are preferably subsequently assembled as described above, or otherwise as is known or conventional in the art, prior to casting.

Although the hereinabove described embodiments of the invention constitute the preferred embodiments, it should be understood that modifications can be made thereto without departing from the scope of the invention as set forth in the appended claims.

What is claimed is:

1. An exhaust manifold comprising a ceramic inner layer defining an exhaust gas passageway of said manifold, a ceramic insulation layer disposed exterior to and adjacent said inner layer, and an outer structural layer disposed exterior to and adjacent said insulation layer, wherein each of said inner and insulation layers comprises ceramic fibers and ceramic filler material, said inner layer further comprising a catalyst effective to convert at least a portion of CO and $NO_x$ in an exhaust gas flowing through said exhaust passageway to $CO_2$ and $N_2$ and $O_2$ respectively.

2. An exhaust manifold according to claim 1, said catalyst being a fluorite metal oxide catalyst, wherein A is a rare earth element, B is either Ce or Zr.

3. An exhaust manifold according to claim 2, where x is 1–4.

4. An exhaust manifold according to claim 1, wherein said catalyst has the form $ABO_x$ and is selected from the group consisting of a) a perovskite catalyst, wherein A is a rare earth element and an alkaline earth element, and B is a transition metal element; and b) a fluorite catalyst, wherein A is a rare earth element and B is Ce or Zr.

5. An exhaust manifold according to claim 4, said catalyst being a perovskite metal oxide catalyst, wherein A is lanthanum and strontium, and B is selected from the group consisting of iron, cobalt, manganese, titanium, gallium, chromium, and nickel.

6. An exhaust manifold according to claim 5, where x is 2–5.

7. An exhaust manifold comprising a ceramic inner layer having a smooth, substantially nonporous inner surface defining an exhaust gas passageway of said manifold, a porous ceramic insulation layer disposed exterior to and adjacent said inner layer, a strain isolation layer disposed exterior to and adjacent said ceramic insulation layer, and an outer structural layer disposed exterior to and adjacent said strain isolation layer, wherein each of said inner and insulation layers comprises ceramic fibers and ceramic filler material, said strain isolation layer being a compliant layer effective to accommodate unmatched thermal expansion between said outer structural layer and said ceramic insulation layer, said strain isolation layer being more compliant than said ceramic insulation layer, said strain isolation thereby being more readily deflectable from an applied mechanical load than said ceramic insulation layer under the same mechanical load.

8. An exhaust manifold according to claim 7, wherein said inner layer is 40–98 wt. % ceramic filler material, balance ceramic fibers.

9. An exhaust manifold according to claim 7, wherein said inner layer is 0.05–5 mm thick.

10. An exhaust manifold according to claim 7, wherein said insulation layer is 1–40 mm thick.

11. An exhaust manifold according to claim 7, wherein said insulation layer is substantially 100 wt. % ceramic fibers.

12. An exhaust manifold according to claim 7, wherein said outer layer is 1–25 mm thick.

13. An exhaust manifold according to claim 7, wherein said ceramic fibers are aluminosilicate fibers.

14. An exhaust manifold according to claim 7, wherein said ceramic fibers are selected from the group consisting of silica fibers, alumina fibers, zirconia fibers, alumina-borosilicate fibers, and mixtures thereof.

15. An exhaust manifold according to claim 7, wherein said ceramic filler material is substantially stable against oxidation in an oxidizing environment up to 2000° F.

16. An exhaust manifold according to claim 7, wherein said ceramic filler material is selected from the group consisting of alumina, aluminosilicate, silica, and other metal oxides.

17. An exhaust manifold according to claim 7, wherein said ceramic filler material is a glass-ceramic flit material comprising alumina, silica, $TiO_2$, $B_2O_3$ and an alkaline earth oxide.

18. An exhaust manifold according to claim 7, wherein said ceramic filler material is selected from the group consisting of alkaline oxides, alkaline earth oxides, rare earth oxides, transition metal oxides, SiC, $Si_3N4$, SiB4, refractory metal carbides, refractory metal nitrides, refractory metal oxides, and mixtures thereof.

19. An exhaust manifold according to claim 7, wherein said ceramic filler material is selected from the group consisting of calcium borosilicate glass, aluminosilicate glass, calcium aluminoborate glass, other glass materials, and mixtures thereof.

20. An exhaust manifold according to claim 7, wherein said strain isolation layer is a substantially boron nitride layer.

21. An exhaust manifold according to claim 7, said strain isolation layer being 0.05–2 mm thick.

22. An exhaust manifold according to claim 7, said ceramic inner layer being provided as a glaze on an inner surface of said ceramic insulation layer.

23. An exhaust manifold according to claim 7, said ceramic filler material being selected from the group consisting of alumina, mullite, silica, titania, magnesia, ceria, and borides, carbides, nitrides and oxides of other refractory metals, and mixtures thereof.

24. An exhaust manifold according to claim 7, said ceramic filler material being selected from the group consisting of partially stabilized zirconia, SiC, SiN, aluminum nitride, silicon boride, and molybdenum disilicilide.

25. An exhaust manifold according to claim 7, said ceramic inner layer having a localized porosity at the inner surface thereof of less than 5%.

26. An exhaust manifold according to claim 7, wherein said outer structural layer is a metal-containing layer or a metal composite layer.

27. An exhaust manifold according to claim 26, wherein said outer structural layer comprises a material selected from the group consisting of aluminum, iron, steel, alloys thereof, and metal composite materials containing ceramic filler material.

28. An exhaust manifold according to claim 7, wherein said insulation layer is 1–35 wt. % ceramic filler material, balance ceramic fibers.

29. An exhaust manifold according to claim 28, wherein said ceramic fibers in said insulation layer are selected from the group consisting of silica fibers, alumina fibers, aluminosilicate fibers having 40–99 wt. % alumina content, boroaluminosilicate fibers having 40–99 wt. % alumina content, and mixtures thereof.

30. An exhaust manifold according to claim 28, wherein said insulation layer has a porosity of 20–95 percent.

31. An exhaust manifold according to claim 7, wherein said outer structural layer is a metal layer and said strain isolation layer comprises ceramic fibers and ceramic filler material, said ceramic filer material in said strain isolation layer being selected to resist molten metal seepage during casting of said metal layer.

32. An exhaust manifold according to claim 31, wherein said strain isolation layer is 70–99 wt. % ceramic fibers, balance ceramic filler material.

33. An exhaust manifold according to claim 31, wherein said ceramic fibers in said strain isolation layer are selected from the group consisting of silica fibers, alumina fibers, zirconia fibers, alumina-borosilicate fibers, and mixtures thereof.

34. An exhaust manifold according to claim 33, wherein said metal layer is a ferrous metal layer and said ceramic filler material in said strain isolation layer is selected from the group consisting of zirconia, alumina, boron nitride, zircon, and mixtures thereof.

35. An exhaust manifold according to claim 33, wherein said metal layer is an aluminum or aluminum alloy metal layer, and said ceramic flier material in said strain isolation layer is selected from the group consisting of calcium aluminoborate glass, calcium aluminoborosilicate, calcium aluminate cement, boron nitride and mixtures thereof.

36. An exhaust manifold comprising a ceramic inner layer defining an exhaust gas passageway of said manifold, a ceramic insulation layer disposed exterior to and adjacent said inner layer, a strain isolation layer disposed exterior to and adjacent said ceramic insulation layer, and an outer structural layer disposed exterior to and adjacent said strain isolation layer, wherein each of said inner and insulation layers comprises ceramic fibers and ceramic filler material, the ceramic filler material in said inner layer comprising a ceramic frit having a material selected from the group consisting of alumina, silica, $B_2O_3$, $P_2O_5$, $TiO_2$, alkaline earth oxides, and mixtures thereof, said inner layer being a dense ceramic layer having a smooth inner surface adjacent said exhaust gas passageway, said inner surface of said inner layer being substantially nonporous, said strain isolation layer being more compliant than said ceramic insulation layer, said strain isolation layer thereby being more readily deflectable from an applied mechanical load than said ceramic insulation layer under the same mechanical load.

37. A method of making an exhaust manifold comprising the steps of:
 a) providing a first aqueous slurry having 1–2 wt. % solids, said solids comprising a mixture of ceramic filler material and ceramic fibers;

b) vacuum forming an insulation layer from said first aqueous slurry;

c) providing a second aqueous slurry having 1–2 wt. % solids, said solids comprising a mixture of ceramic filler material and ceramic fibers;

d) vacuum forming from said second aqueous slurry an inner layer an on interior wall surface of said insulation layer;

e) firing the formed insulation and inner layers to provide finished insulation and inner layers respectively;

f) casting a metal outer layer over said insulation layer to form said exhaust manifold;

said exhaust manifold thereby comprising said inner layer defining an exhaust gas passageway of said manifold, said ceramic insulation layer disposed exterior to and adjacent said inner layer, and said metal outer layer disposed exterior to and adjacent said ceramic insulation layer, said exhaust manifold further comprising a strain isolation layer disposed between said ceramic insulation layer and said metal outer layer, said strain isolation layer being a compliant layer effective to accommodate unmatched thermal expansion between said metal outer layer and said ceramic insulation layer, wherein said insulation and inner layers formed respectively in steps (b) and (d) are formed as two halves, wherein said two halves are joined by a ceramic adhesive to provide complete formed inner and insulation layers prior to firing thereof in step (e).

38. A method of making an exhaust manifold comprising the steps of:

a) combining ceramic fibers, ceramic filler material, a binder, and water in the following proportions to form a dough paste;

| | |
|---|---|
| Ceramic fibers: | 10–30 wt. % |
| Ceramic filler material: | 5–15 wt. % |
| Binder: | 3–10 wt. % |
| Water: | BALANCE; | b) mixing the dough paste to form a moldable dough;

c) pressing said moldable dough into a mold to form a shaped part;

d) curing or heating said shaped part to burn off residual organics and water, forming a finished insulation layer;

e) providing an aqueous slurry having 1–2 wt. % solids, said solids comprising a mixture of ceramic filler material and ceramic fibers;

f) vacuum forming or spray coating from said aqueous slurry an inner layer on an interior wall surface of said insulation layer;

g) firing the formed insulation and inner layers to provide finished insulation and inner layers respectively; and h) casting a metal outer layer over said insulation layer to form said exhaust manifold;

said exhaust manifold thereby comprising said inner layer defining an exhaust gas passageway of said manifold, said ceramic insulation layer disposed exterior to and adjacent said inner layer, and said metal outer layer disposed exterior to and adjacent said ceramic insulation layer, said exhaust manifold further comprising a strain isolation layer disposed between said ceramic insulation layer and said metal outer layer, said strain isolation layer being a compliant layer effective to accommodate unmatched thermal expansion between said metal outer layer and said ceramic insulation layer, wherein said insulation layer in step (d) is formed as two halves, wherein said two halves are lamed with a ceramic adhesive to form a complete insulation lever prior to firing in step (g).

* * * * *

UNITED STATES PATENT AND TRADEMARK OFFICE
CERTIFICATE OF CORRECTION

PATENT NO. : 6,725,656 B2
DATED : April 27, 2004
INVENTOR(S) : Dan T. Moore, III and Ajit Y. Sane It is certified that error appears in the above-identified patent and that said Letters Patent is hereby corrected as shown below:

Column 11,
Line 35, please delete "flit" and insert therefor -- frit --.

Column 12,
Line 41, please delete "flier" and insert therefor -- filler --.

Signed and Sealed this

Fifth Day of October, 2004

JON W. DUDAS
*Director of the United States Patent and Trademark Office*